(12) United States Patent
Chen et al.

(10) Patent No.: US 10,168,726 B2
(45) Date of Patent: Jan. 1, 2019

(54) SELF-ADAPTIVE STARTUP COMPENSATION DEVICE

(71) Applicant: ANPEC ELECTRONICS CORPORATION, Hsinchu (TW)

(72) Inventors: Chih-Ning Chen, Taipei (TW); Chun-Kai Hsu, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/038,262

(22) Filed: Jul. 18, 2018

(65) Prior Publication Data

US 2018/0321702 A1 Nov. 8, 2018

Related U.S. Application Data

(63) Continuation-in-part of application No. 15/408,832, filed on Jan. 18, 2017, now abandoned.

(30) Foreign Application Priority Data

Nov. 16, 2016 (TW) .............................. 105137464 A (51) Int. Cl.
| | |
|---|---|
| *G05F 3/26* | (2006.01) |
| *H02M 1/36* | (2007.01) |
| *H02M 3/158* | (2006.01) |
| *H02M 1/00* | (2006.01) |

(52) U.S. Cl.
CPC .............. *G05F 3/262* (2013.01); *H02M 1/36* (2013.01); *H02M 3/158* (2013.01); *H02M 2001/0006* (2013.01)

(58) Field of Classification Search
CPC . H02M 1/36; H02M 3/158; H02M 2001/0006
See application file for complete search history.

(56) References Cited

U.S. PATENT DOCUMENTS

| 5,514,947 A * | 5/1996 | Berg .......................... G05F 1/44 |
| | | 323/282 |
| 2003/0142519 A1* | 7/2003 | Walters ................. H02M 3/156 |
| | | 363/89 |
| 2005/0285580 A1* | 12/2005 | Chen ..................... H02M 3/156 |
| | | 323/282 |
| 2017/0023960 A1* | 1/2017 | Ogura ..................... G05F 1/565 |

* cited by examiner

*Primary Examiner* — Adolf Berhane
*Assistant Examiner* — Bart Iliya
(74) *Attorney, Agent, or Firm* — Li & Cai Intellectual Property (USA) Office (57) ABSTRACT

The present disclosure provides a self-adaptive startup compensation device. The self-adaptive startup compensation device provides an operational transconductance amplifier that outputs a bias current to the error amplifier of the negative feedback loop of the DC-to-DC converter in such a manner that the error amplifier adjusts the error amplifier signal to be outputted, thereby adjusting the compensation signal generated by the negative feedback loop during a startup period.

8 Claims, 6 Drawing Sheets

SELF-ADAPTIVE STARTUP COMPENSATION DEVICE

BACKGROUND OF THE INVENTION

1. Field of the Invention

The present disclosure relates to a self-adaptive startup compensation device, in more particularly to a self-adaptive startup compensation device using an operational transconductance amplifier.

2. Description of Related Art

Generally speaking, a DC-to-DC converter contains a negative feedback loop with an error amplifier in order to maintain the output voltage of the DC-to-DC converter within a desirable range. The error amplifier generates an error amplifier signal according to a feedback voltage and a reference voltage received by the error amplifier. In addition, a DC-to-DC converter in the prior art is often operated in a decreasing-frequency mode so as to suppress the inrush current during a power-up period of the electronic appliance connected to the DC-to-DC converter. In this way, the overshoot of the output voltage of the DC-to-DC converter during a power-up period can be limited.

However, operating a DC-to-DC converter in a decreasing frequency mode is unfavorable for keeping the output voltage of the DC-to-DC converter stable. The DC-to-DC converter in the prior art includes a compensation circuit in the negative feedback loop so as to maintain the loop gain and stability. The compensation circuit is composed of at least one resistor and at least one capacitor that have fixed impedance and capacitance respectively. As a consequence, the error amplifier signal processed and outputted by the compensation circuit as a compensation signal fails to be an optimized compensation signal that corresponds to the decreasing frequency mode.

In view of the above, the compensation signal provided by the negative feedback loop contained in a prior art DC-to-DC converter operated under a decreasing frequency mode cannot keep the waveform of the DC-to-DC converter stable during the power-on procedure thereof. Therefore, to solve the aforementioned problem, the present disclosure provides a startup compensation device, which self-adaptively adjusts the compensation signal to be outputted by the negative feedback loop under a decreasing frequency mode, thereby ensuring the stability of the waveform of the DC-to-DC converter during startup period.

SUMMARY OF THE INVENTION

A self-adaptive startup compensation device is provided, which includes a reference voltage generating circuit and a DC-to-DC converter. The reference voltage generating circuit includes first to fifth transistors and first and second current mirrors. The DC-to-DC converter includes first and second transconductance amplifiers, an error amplifier, a clock circuit, a PWM controller, a RAMP generator, a comparator and a switch circuit. An input terminal of the first transistor is connected to a voltage source. An output terminal of the first transistor is connected to input terminals of the second and third transistors. An output terminal of the second transistor is connected to a control terminal of the second transistor, an input terminal of the fourth transistor and a control terminal of the fifth transistor. An output terminal of the third transistor is connected to a control terminal of the third transistor and an input terminal of the fifth transistor. The output terminal of the third transistor is grounded through a first capacitor. Output terminals of the fourth and fifth transistors are grounded. Input terminals of the first current mirror are connected to the output terminal of the first transistor. First and second output terminals of the first current mirror are connected to input terminals of the second current mirror respectively. The second output terminal of the first current mirror is connected to control terminals of the first and fourth transistors.

Preferably, the self-adaptive startup compensation device further includes a drive circuit disposed between the PWM controller and the switch circuit, the drive circuit has an input terminal connected to the output terminal of the PWM controller and an output terminal connected to a control terminal of the switch circuit.

Preferably, the self-adaptive startup compensation device further includes a divider circuit connected between the switch circuit and the error amplifier and configured to divide an output voltage from the switch circuit to output a feedback voltage to the inverting input terminal of the error amplifier.

Preferably, the first current mirror includes sixth and seventh transistors and the second current mirror includes eighth to tenth transistors. Input terminals of the sixth and seventh transistors are connected to the output terminal of the first transistor. Control terminals of the sixth and seventh transistors are connected to each other. An output terminal of the sixth transistor is connected to the control terminal of the sixth transistor and an input terminal of the eighth transistor. Control terminals of the eighth and tenth transistors are connected to each other. An input terminal of the tenth transistor is connected to the control terminal of the tenth transistor and the output terminal of the ninth transistor. An input terminal of the ninth transistor is connected to a control terminal of the ninth transistor and an output terminal of the seventh transistor. Output terminals of the eight and tenth transistors are grounded.

Preferably, the first non-inverting input terminal of the error amplifier is connected to the one terminal of the first capacitor, and the second non-inverting input terminal of the error amplifier is connected between the output terminal of the seventh transistor and the input terminal of the ninth transistor.

Preferably, the second current mirror further includes a second capacitor. Two terminals of the second capacitor are connected to the output terminal of the sixth transistor and the control terminal of the eight transistor respectively.

Preferably, the self-adaptive startup compensation device further includes a compensation circuit disposed between the error amplifier and the comparator, an input terminal of the compensation circuit is connected to the output terminal of the error amplifier, and an output terminal of the compensation circuit is connected to the inverting input terminal of the comparator.

Preferably, the compensation circuit includes a resistor, a third capacitor and a fourth capacitor, two terminals of the resistor are connected to the output terminal of the error amplifier and one terminal of the third capacitor respectively, another terminal of the third capacitor is grounded, two terminals of the fourth capacitor are connected to the output terminal of the error amplifier and grounded respectively.

In summary, the self-adaptive startup compensation device provided by the present disclosure dispense with the use of complex circuits and the need to modify the impedance of the negative feedback loop that are often required in order to limit the adverse effect caused by the impedance of the compensation circuit; instead, through the use of an operational transconductance amplifier that provides a bias current to the error amplifier of the negative feedback loop, the present disclosure enables the negative feedback loop to adjust the compensation signal to be outputted during a power-up period in such a manner that the compensation signal can achieve the self-adaptive compensation effect that corresponds to the decreasing frequency, thereby maintaining the waveform of the DC-to-DC converter stable.

In order to further the understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in subsequent descriptions and appended drawings.

First Embodiment

Figure 1:
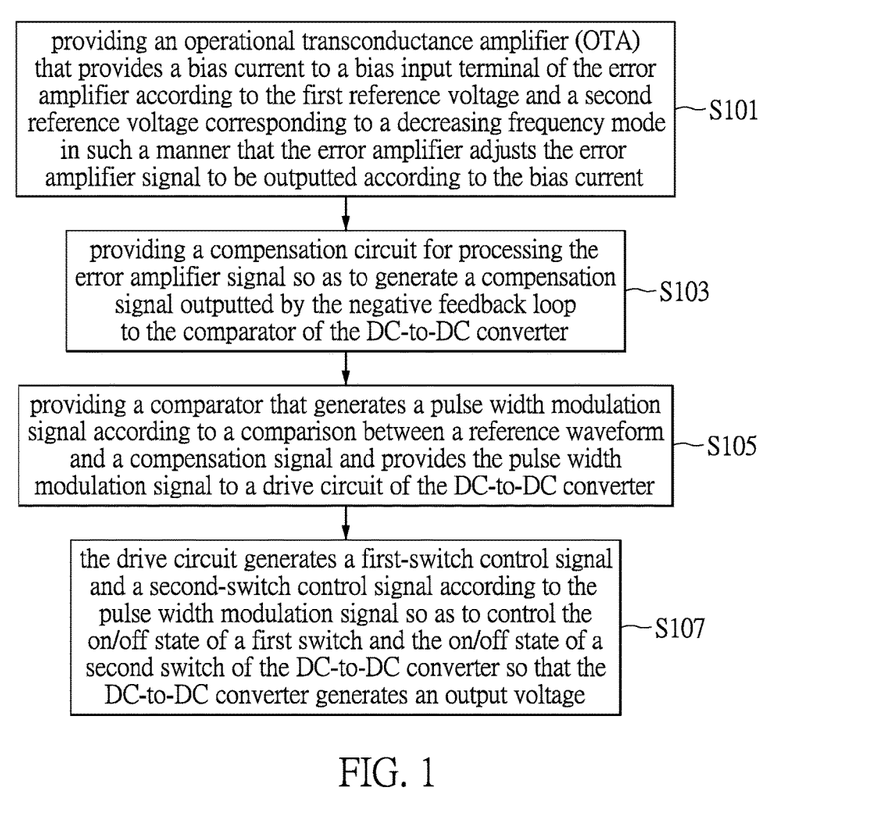
FIG. 1 is a flowchart illustrating a self-adaptive startup compensation method for a self-adaptive startup compensation device according to a first embodiment of the present disclosure.
Figure 2:
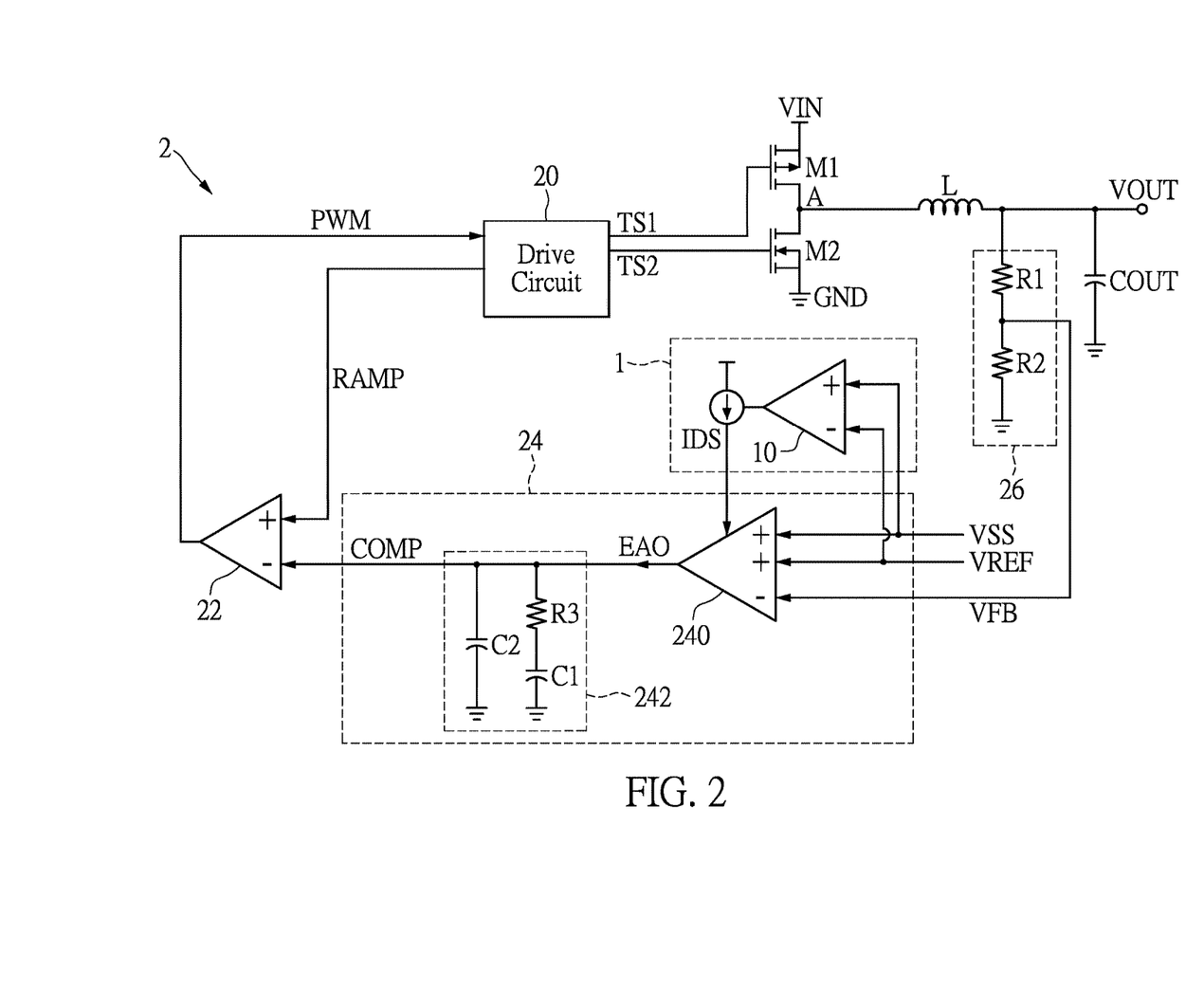
FIG. 2 is a schematic diagram illustrating a self-adaptive startup compensation device according to the first embodiment of the present disclosure.

Referring to FIGS. 1 and 2, the self-adaptive startup compensation method illustrated in FIG. 1 can be performed by the self-adaptive startup compensation device shown in FIG. 2. However, the self-adaptive startup compensation method of the present disclosure is not limited to being performed by the self-adaptive startup compensation device of FIG. 2. Furthermore, the self-adaptive startup compensation device of FIG. 2 is only one of the ways of implementing the self-adaptive startup compensation method for the self-adaptive startup compensation device of the present disclosure; in other words, the way of implementing the self-adaptive startup compensation method of the present disclosure is not limited to the self-adaptive startup compensation device of FIG. 2.

The self-adaptive startup compensation device and the method thereof provided by the present disclosure can be applied to any DC-to-DC converter having a negative feedback loop. In other words, the present disclosure is not limited by the type of DC-to-DC converter. For instance, the DC-to-DC converter in the present disclosure can be a boost type converter or a buck type converter. To facilitate the explanation of the present disclosure, a buck type converter is used in the embodiments described below; however, the present disclosure is not limited to this. In addition, since the working principle of DC-to-DC converter is known in the art, the details thereof will not be explained herein.

Referring to FIG. 2, the DC-to-DC converter 2 mainly includes a switch circuit including first switch M1 and a second switch M2, an output inductor L, an output capacitor COUT, a drive circuit 20, a comparator 22, a negative feedback loop 24, and a self-adaptive startup compensation device 1. The first switch M1 and the second switch M2 are connected between an input voltage VIN and a ground voltage GND in series. It should be noted that, in the present embodiment, the first switch M1 can be a P-channel MOSFET (PMOS), and the second switch M2 can be an N-channel MOSFET (NMOS). However, the present disclosure is not limited to these examples. A person skilled in the art can modify the first switch M1 and the second switch M2 as needed.

Furthermore, the output inductor L is connected to the node A between the first switch M1 and the second switch M2 and is used for outputting an output voltage VOUT. The negative feedback loop 24 receives part of the output voltage VOUT as a feedback voltage VFB via a divider circuit 26. It should be noted that, as shown in FIG. 2, the divider circuit 26 is composed of two resistors R1 and R2. However, the present disclosure is not limited to this. In other words, a person skilled in the art can design the divider circuit 26 as required. Besides, since the working principle of divider circuit is common knowledge in the art, the details concerning the resistors R1 and R2 will not be further explained herein.

Moreover, as in a typical design of a DC-to-DC converter, the negative feedback loop 24 includes an error amplifier 240 and a compensation circuit 242. When the DC-to-DC converter 2 is in a normal operation mode, the non-inverting input terminal of the error amplifier 240 is connected to a reference voltage VREF, and the inverting input terminal of the error amplifier 240 is connected to the feedback voltage VFB. The error amplifier 240 provides an error amplifier signal EAO according to a comparison between the reference voltage VREF and the feedback voltage VFB, and the error amplifier signal EAO turns into a compensation signal COMP after being processed by the compensation circuit 242. The compensation circuit 242 provides the compensation signal COMP to the comparator 22, which generates a pulse width modulation signal PWM by comparing a RAMP signal having a reference waveform RAMP (a ramp waveform) with the compensation signal COMP and then provides the pulse width modulation signal PWM to the drive circuit 20.

In addition, the drive circuit 20 outputs a first switch control signal TS1 and a second switch control signal TS2 in accordance with the pulse width modulation signal PWM, in which the first switch control signal TS1 and the second switch control signal TS2 control the on/off states of the first switch M1 and the second switch M2 respectively. It should be noted that the details regarding the DC-to-DC converter 2 in a normal operation mode will not be explained herein since the working principle of a DC-to-DC converter is common knowledge in the art.

As stated above, the compensation circuit 242 is composed of at least one resistor and/or at least one capacitor that have fixed impedance and capacitance respectively, i.e. the capacitors C1 and C2 and the resistor R3 shown in FIG. 2. The impedance of the resistor R3 and the capacitance of capacitors C1 and C2 are designed according to the normal operation mode of the DC-to-DC converter 2; hence, when the DC-to-DC converter 2 is being powered up, that is, when the negative feedback loop 24 is operated in a decreasing frequency mode, the compensation signal COMP provided by the compensation circuit 242 may not ideally correspond to the decreasing frequency mode.

In view of the above description, a person skilled in the art shall understand the spirit of the present disclosure, which is providing the DC-to-DC converter 2 with the self-adaptive startup compensation device 1 so as to enable the DC-to-DC converter 2 to adjust the compensation signal COMP generated by the negative feedback loop 24. The detailed embodiment of the self-adaptive startup compensation device 1 of the present disclosure will be explained below with reference to FIG. 2. It should be noted that the self-adaptive startup compensation device 1 is only a way of implementing the present disclosure, and the following description shall not be construed as limiting the present disclosure.

Specifically, the self-adaptive startup compensation device 1 includes an operational transconductance amplifier 10, in which the inverting input terminal of the operational transconductance amplifier 10 is connected to the reference voltage VREF corresponding to a constant frequency mode, i.e. the normal operating mode, and the non-inverting input terminal of the operational transconductance amplifier 10 is connected to the reference voltage VSS corresponding to the decreasing frequency mode. In addition, the output terminal of the operational transconductance amplifier 10 is connected to a bias input terminal of the error amplifier 240 of the negative feedback loop 24. Accordingly, when the DC-to-DC converter 2 is in a startup state, the error amplifier 240 provides the error amplifier signal EAO in accordance with the feedback voltage VFB and the reference voltage VSS.

By the above structural means, when the DC-to-DC converter 2 is in a startup state, the operational transconductance amplifier 10 provides a bias current IDS to the bias input terminal of the error amplifier 240 in accordance with the reference voltage VREF and the reference voltage VSS, and the error amplifier 240 outputs an error amplifier signal EAO according to the bias current IDS. It should be noted that the present disclosure is not limited by how the reference voltage VSS is determined. The reference voltage VSS can be another reference voltage for the error amplifier 240 in a decreasing frequency mode.

The present disclosure is not limited by the way that the error amplifier 240 outputs the error amplifier signal EAO in accordance with the feedback voltage VFB and the reference voltage VSS. A person skilled in the art can modify the present embodiment as needed. The technical means adopted by the present embodiment is to adjust the error amplifier signal EAO generated by the error amplifier 240 and not to modify the impedances of the resistor R3 and the capacitors C1 and C2, by which the compensation signal COMP provided by the negative feedback loop 24 can achieve an optimized compensation effect corresponding to the decreasing frequency mode.

That is to say, not until the DC-to-DC converter 2 enters a startup state will the self-adaptive startup compensation device 1 start operating and enable the error amplifier 240 to generate the error amplifier signal EAO that corresponds to the decreasing frequency mode according to the reference voltage VSS, the feedback voltage VFB, and the bias current IDS. Furthermore, when the DC-to-DC converter 2 enters the normal operation mode, the self-adaptive startup compensation device 1 will stop operating and the error amplifier 240 will generate the error amplifier signal EAO according the reference voltage VREF and the feedback voltage VFB.

The drive circuit 20 of the present embodiment can further include a timing-pulse generator (not shown in the drawings) for generating clock signals that correspond to the frequency mode under which the DC-to-DC converter 2 is operated, e.g. a constant frequency mode or a decreasing frequency mode.

The self-adaptive startup compensation method for the DC-to-DC converter 2 is described below with reference to FIG. 1. It should be noted that, in the self-adaptive startup compensation method, the error amplifier of the DC-to-DC converter generates an error amplifier signal according to a received feedback voltage and a first reference voltage corresponding to a decreasing frequency mode. The self-adaptive startup compensation method includes the following steps:

Step S101: providing an operational transconductance amplifier (OTA) that provides a bias current to a bias input terminal of the error amplifier according to the first reference voltage and a second reference voltage corresponding to a decreasing frequency mode in such a manner that the error amplifier adjusts the error amplifier signal to be outputted according to the bias current;

Step S103: providing a compensation circuit composed of at least one resistor and/or at least one capacitor for processing the error amplifier signal so as to generate a compensation signal outputted by the negative feedback loop to the comparator of the DC-to-DC converter, in which the at least one resistor has fixed impedance and the at least one capacitor has fixed capacitance;

Step S105: providing a comparator that generates a pulse width modulation signal according to a comparison between a reference waveform and a compensation signal and provides the pulse width modulation signal to a drive circuit of the DC-to-DC converter; and Step S107: the drive circuit generates a first-switch control signal and a second-switch control signal according to the pulse width modulation signal so as to control the on/off state of a first switch and the on/off state of a second switch of the DC-to-DC converter so that the DC-to-DC converter generates an output voltage.

It should be noted that the specifics of steps S103 and S107 will not be further explained herein since the two steps mainly describe the working principle of DC-to-DC converter well known in the art. Furthermore, step S101 of the self-adaptive startup compensation method according to the present embodiment will not be performed unless the DC-to-DC converter is in a startup state. After the power-on procedure of the DC-to-DC converter, the DC-to-DC converter enters the normal operation mode and step S101 will stop being executed and, at the same time, the error amplifier resumes providing error amplifier signals according to the feedback voltage and the second reference voltage, and then steps S103 to S107 follow.

Figure 3A:
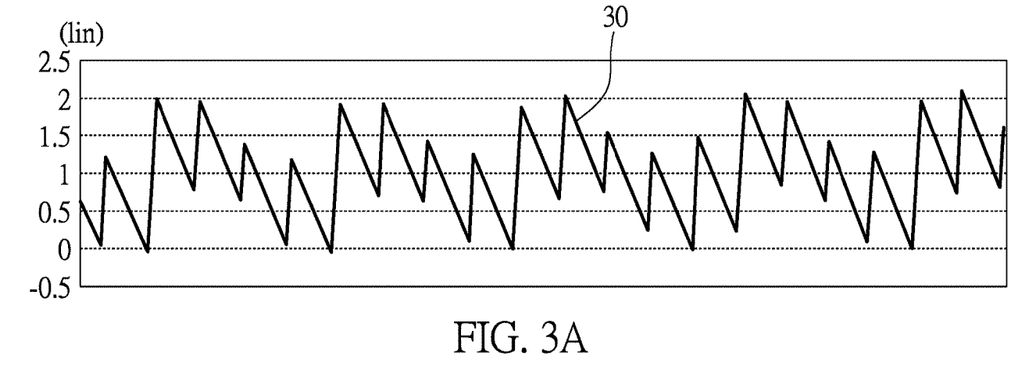
FIGS. 3A and 3B show a waveform comparison between an electronic appliance using the self-adaptive startup compensation device and the method thereof according to the first embodiment of the present disclosure and the electronic appliance not using the self-adaptive startup compensation device and the method thereof of the present disclosure.
Figure 3B:
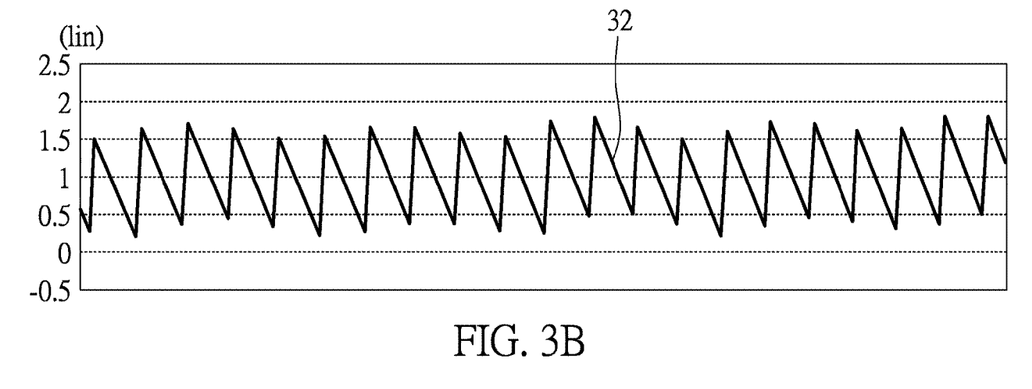

Reference is next made to FIGS. 3A and 3B, a waveform comparison between an electronic appliance using the self-adaptive startup compensation device and the method thereof provided by the present disclosure and the electronic appliance not using the self-adaptive startup compensation device and the method thereof provided by the present disclosure is shown. As can be seen from the figures, when in a startup state, the DC-to-DC converter not using the self-adaptive startup compensation device and the method thereof would generate a perturbed output waveform 30 as shown in FIG. 3A, while the DC-to-DC converter and the method thereof would generate a steady and unperturbed output waveform 32 as shown in FIG. 3B.

In summary, the self-adaptive startup compensation device and the method thereof provided by the present disclosure dispense with the use of complex circuits and the need to modify the impedance of the negative feedback loop that are often required in order to limit the adverse effect caused by the impedance of the compensation circuit; instead, through the use of an operational transconductance amplifier that provides a bias current to the error amplifier of the negative feedback loop, the present disclosure enables the negative feedback loop to adjust the compensation signal to be outputted during a power-up period in such a manner that the compensation signal can achieve the self-adaptive compensation effect that corresponds to the decreasing frequency, thereby maintaining the waveform of the DC-to-DC converter stable.

Second Embodiment

Figure 4:
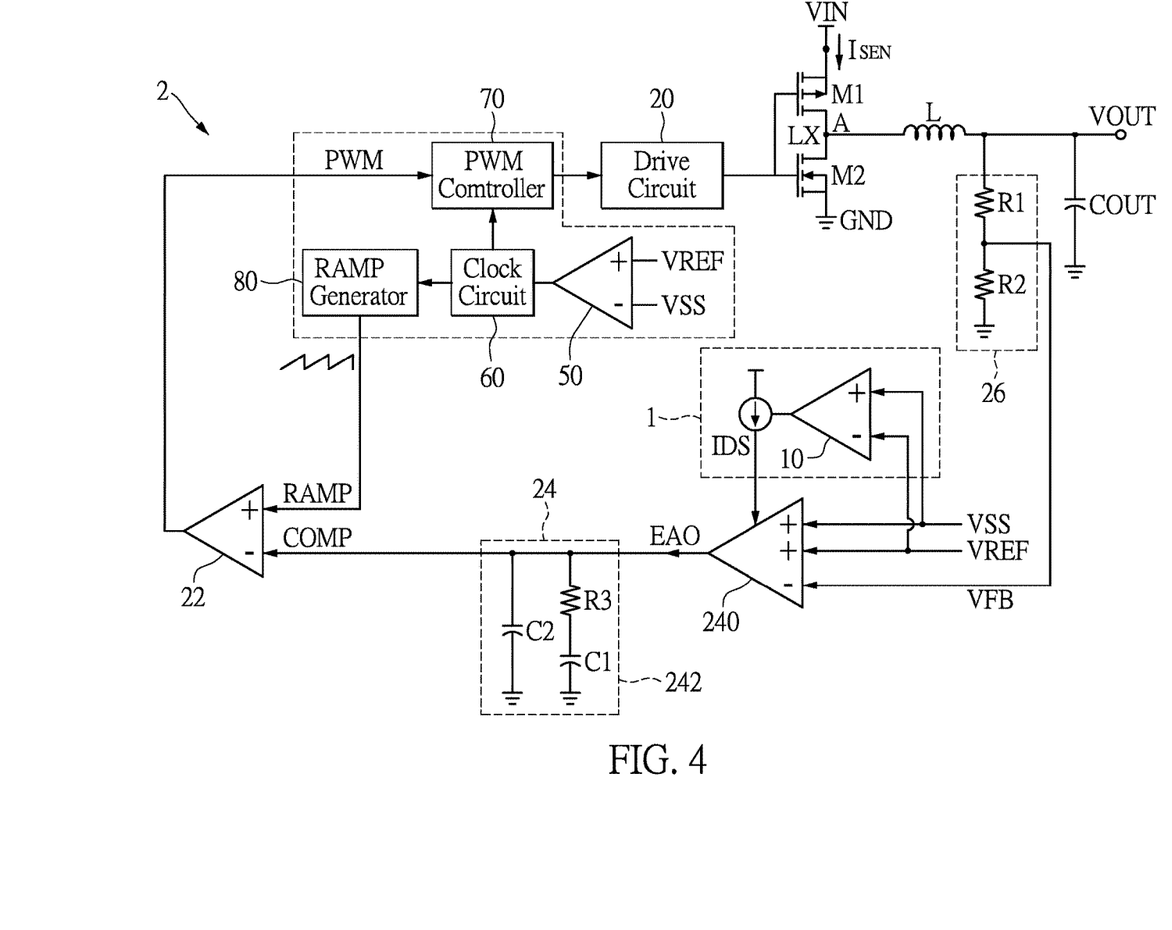
FIG. 4 is a schematic diagram illustrating a self-adaptive startup compensation device according to a second embodiment of the present disclosure.
Figure 5:
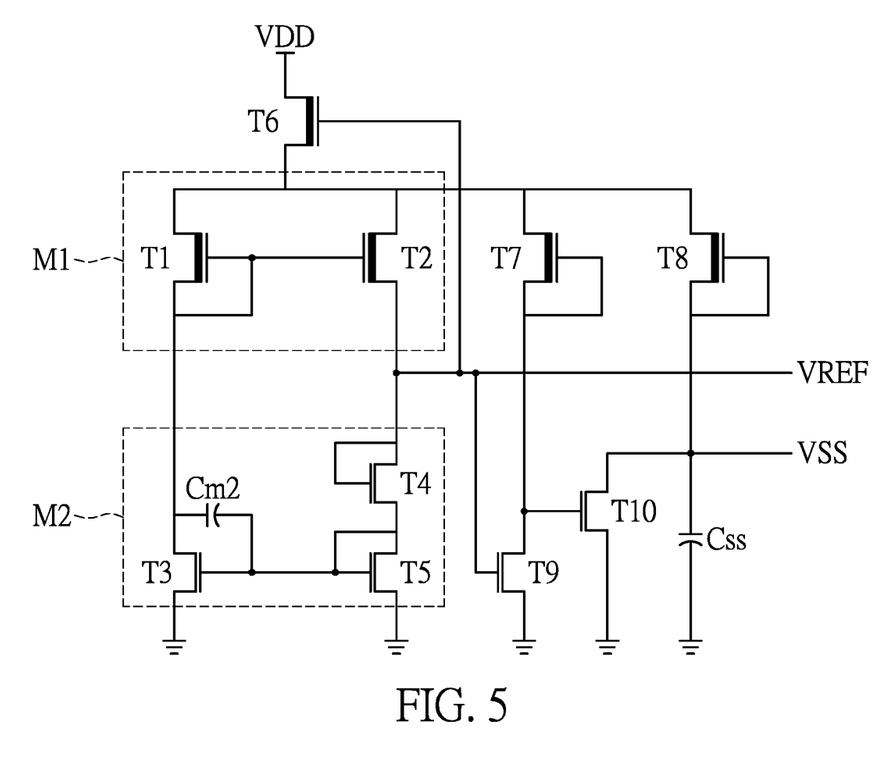
FIG. 5 is a schematic diagram illustrating a reference voltage generating circuit of the self-adaptive startup compensation device according to the second embodiment of the present disclosure.

Reference is made to FIGS. 4 and 5, where FIG. 4 is a schematic diagram illustrating a self-adaptive startup compensation device according to a second embodiment of the present disclosure, FIG. 5 is a schematic diagram illustrating a reference voltage generating circuit of the self-adaptive startup compensation device according to the second embodiment of the present disclosure.

The difference between the above first embodiment and the second embodiment is that, the self-adaptive startup compensation device of the second embodiment further includes an operational transconductance amplifier 50, a clock circuit 60, a PWM controller 70 and a RAMP generator 80 as shown in FIG. 4, and a reference voltage generating circuit as shown in FIG. 5, in addition to the drive circuit 20, the comparator 22, the negative feedback loop 24 including the error amplifier 240 and the compensation circuit 242, the self-adaptive startup compensation device 1 including the operational transconductance amplifier 10, the divider circuit 26, the switch circuit including the first switch M1 and the second switch M2, the output inductor L and the output capacitor COUT as shown in FIG. 4.

More specifically, as shown in FIG. 4, the non-inverting input terminal of the operational transconductance amplifier 10 is configured to receive a reference voltage VSS. The inverting input terminal of the operational transconductance amplifier 10 is configured to receive a reference voltage VREF. The output terminal of the operational transconductance amplifier 10 is connected to the bias input terminal of the error amplifier 240.

The two non-inverting input terminals of the error amplifier 240 are configured to receive the reference voltage VREF and the reference voltage VSS respectively. The inverting input terminal of the error amplifier 240 is connected to the switch circuit through the divider circuit 26 and the output inductor L. In detail, the resistance R1 and the resistance R2 of the divider circuit 26 are connected to each other in serial. The inverting input terminal of the error amplifier 240 is connected between the resistance R1 and the resistance R2 of the divider circuit 26 to obtain the feedback voltage VFB.

For example, when the self-adaptive startup compensation device is being powered up, that is, when it is operated in the decreasing frequency mode, the error amplifier 240 receives the reference voltage VSS, and then the error amplifier 240 provides an error amplifier signal EAO according to a comparison between the reference voltage VSS and the feedback voltage VFB. Further, when the self-adaptive startup compensation device enters the normal operation mode, the error amplifier 240 receives the reference voltage VREF in the constant frequency mode, and then the error amplifier 240 provides an error amplifier signal EAO according to a comparison between the reference voltage VREF and the feedback voltage VFB.

The output terminal of the error amplifier 240 is connected to the input terminal of the compensation circuit 242. The compensation circuit 242 receives the error amplifier signal EAO from the error amplifier 240 in the normal operation mode or the decreasing frequency mode. The compensation circuit 242 then turns the error amplifier signal EAO into the compensation signal COMP to be transmitted to the inverting input terminal of the comparator 22.

For example, the compensation circuit 242 includes a resistor R3, capacitors C1 and C2. The resistor R3 and capacitor C1 are connected to each other in serial, where one terminal of the resistor R3 is connected to the output terminal of the error amplifier 240 and another terminal of the resistor R3 is connected to one terminal of the capacitor C1, and another terminal of the capacitor C1 is grounded. One terminal of the capacitor C2 is connected to the output terminal of the error amplifier, and another terminal of the capacitor C2 is grounded.

On the other hand, a non-inverting input terminal of the operational transconductance amplifier 50 is configured to receive the reference voltage VREF, and an inverting input terminal of the operational transconductance amplifier 50 is configured to receive the reference voltage VSS. An output terminal of the operational transconductance amplifier 50 is connected to an input terminal of the clock circuit 60. The transconductance amplifier 50 outputs a current signal based on a transconductance multiplied by a difference between the reference voltage VREF and the reference voltage VSS to trigger the clock circuit 60 to output a clock signal in response to the current signal generated by the operational transconductance amplifier 50 in the decreasing frequency mode.

In the embodiment, one output terminal of the clock circuit 60 is connected to an input terminal of the RAMP generator 80 and an input terminal of the PWM controller 70. The RAMP generator 80 outputs a RAMP signal in response to the clock signal of the clock circuit 60 in the decreasing frequency mode. Alternatively, in practice, the RAMP generator 80 may be disposed inside the PWM controller 70, and the clock circuit 60 is directly connected to the non-inverting input terminal of the comparator 22.

The non-inverting input terminal of the comparator 22 is configured to receive the RAMP signal from the RAMP generator 80, and the inverting input terminal of the comparator 22 is configured to receive the compensation signal COMP from the compensation circuit 242. The output terminal of the comparator 22 is connected to the PWM controller 70 to output a pulse width modulation signal PWM to the PWM controller 70 based on comparison of the RAMP signal with the compensation signal COMP.

Another output terminal of the clock circuit 60 is connected to an output terminal of the PWM controller 70. An output terminal of the PWM controller 70 is connected to an output terminal of the drive circuit 20. An output terminal of the drive circuit 20 is connected to a gate terminal of the first switch M1 and a gate terminal of the second switch M2. A source terminal of the first switch M1 is connected to the input voltage Vin and a drain terminal of the first switch M1 is connected to a drain terminal of the second switch M2. A source terminal of the second switch M2 is grounded. One output terminal of the output inductor L is connected between the drain terminal of the first switch M1 and the drain terminal of the second switch M2, and another output terminal of the output inductor L is connected to the output capacitor COUT and the resistor R1 of the divider circuit 26. The PWM controller 70 controls the drive circuit 20 to turn on or turn off the first switch M1 and the second switch M2 according to the pulse width modulation signal PWM from the comparator 22.

It is worth noting that the reference voltage VREF and the reference voltage VSS received by the operational transconductance amplifiers 10 and 50 and the error amplifier 240 are generated by the reference voltage generating circuit in the embodiment. The reference voltage generating circuit will be described in detail as follow.

As shown in FIG. 5, the reference voltage generating circuit includes a first current mirror M1, a second current mirror M2, transistors T6 to T10 and a capacitor Css. The first current mirror M1 includes transistors T1 and T2. The second current mirror M2 includes transistors T3 to T5 and a capacitor Cm2. In the embodiment, for example, the transistors T1, T2, T6 to T8 are depletion NMOS transistors, and the transistors T3 to T5, T9 and T10 are enhancement NMOS transistors, but the present disclosure is not limited thereto.

A drain electrode of the transistor T6 is connected to a voltage source VDD. A drain electrode of the transistor T1 of the first current mirror M1 and a drain electrode of the transistor T2 of the first current mirror M1 are connected to a source electrode of the transistor T6. A gate electrode of the transistor T1 is connected to a source electrode of the transistor T1 and a gate electrode of the transistor T2.

The source electrode of the transistor T1 of the first current mirror M1 is connected to a drain electrode of the transistor T3 of the second current mirror M2. One terminal of a capacitor Cm2 of the second current mirror M2 is connected to a drain electrode of the transistor T3 of the second current mirror M2, and another terminal of the capacitor Cm2 is connected to a gate electrode of the transistor T3. The gate electrode of the transistor T3 is connected to a gate electrode of the transistor T5 of the second current mirror M2. The gate electrode of the transistor T5 is connected to a drain electrode of the transistor T5. A source electrode of the transistor T3 and a source electrode of the transistor T5 are grounded.

A drain electrode of the transistor T5 of the second current mirror M2 is connected to a source electrode of the transistor T4 of the second current mirror M2. A gate electrode of the transistor T4 is connected to a drain electrode of the transistor T4 of the second current mirror M2 and a source electrode of the transistor T2 of the first current mirror M1. A gate electrode of the transistor T6 is connected between the source electrode of the transistor T2 and the drain electrode of the transistor T4.

A drain electrode of the transistor T7 and a drain electrode of the transistor T8 are connected to the source electrode of the transistor T6. A gate electrode of the transistor T7 is connected to a source electrode of the transistor T7. The source electrode of the transistor T7 is connected to a drain electrode of the transistor T9. A gate electrode of the transistor T9 is connected to the source electrode of the transistor T2 and the drain electrode of the transistor T4. A source electrode of the transistor T9 is grounded.

A drain electrode of the transistor T9 is connected to a gate electrode of the transistor T10. A source electrode of the transistor T10 is grounded. A drain electrode of the transistor T10 is connected to a source electrode of the transistor T8 and one terminal of the capacitor Css. Another terminal of the capacitor Css is grounded. The source electrode of the transistor T8 is connected to a gate electrode of the transistor T8.

Further, the reference voltage generating circuit as shown in FIG. 5 is used for the operational transconductance amplifiers 10 and 50 and the error amplifier 240 as shown in FIG. 4.

When the self-adaptive startup compensation device is being powered up, that is, when the negative feedback loop 24 is operated in the decreasing frequency mode, the non-inverting input terminal of the error amplifier 240 is connected to the one terminal of the capacitor Css to receive the reference voltage VSS.

Then, when the self-adaptive startup compensation device enters the normal operation mode, the non-inverting input terminal of the error amplifier 240 is connected between the source electrode of the transistor T2 of the first current mirror M1 and the drain electrode of the transistor T4 of the second current mirror M2 to receive the reference voltage VREF, instead of being connected to the capacitor Css.

It is worth noting that, in the embodiment, the input terminals of the operational transconductance amplifiers 10 and 50 and the error amplifier 240 may synchronously receive voltage, such as the reference voltage VREF or the reference voltage VSS from the reference voltage generating circuit.

Figure 6:
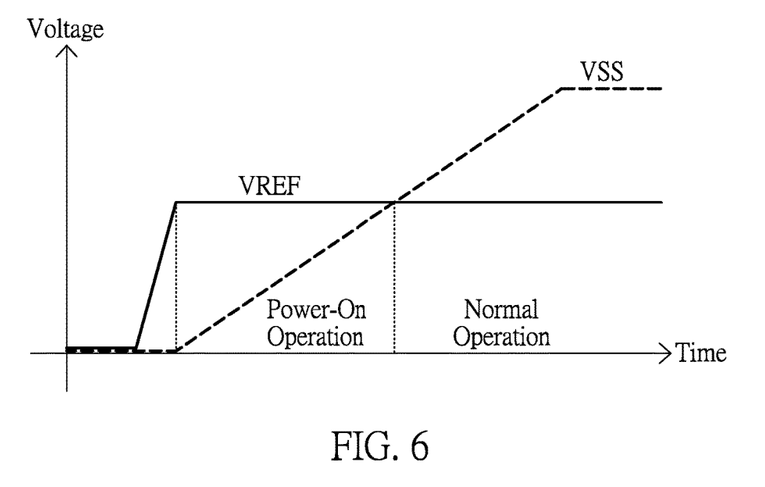
FIG. 6 is a curve diagram illustrating reference voltage versus time curves of the self-adaptive startup compensation device according to the second embodiment of the present disclosure.

Reference is next made to FIG. 6, a curve diagram illustrating reference voltage versus time curves of the self-adaptive startup compensation device according to the second embodiment of the present disclosure is shown.

As shown in FIG. 6, a horizontal axis represents time and a vertical axis represents voltage, and curves represent reference voltage versus time. The self-adaptive startup compensation device is operated in a power-on operation mode (i.e. the decreasing frequency mode) and a normal operation mode.

When the self-adaptive startup compensation device is being powered up, that is, when it is operated in the power-on operation mode, the reference voltage VREF is maintained at a stable value, and then the reference voltage VSS increases linearly over time under the condition that the reference voltage VSS is smaller than the reference voltage VREF.

In the power-on operation mode, the decreasing frequency operation is performed. More specifically, the clock circuit 60 is triggered to output the clock signal by the operational transconductance amplifier 50. The RAMP generator 80 then outputs a RAMP signal to the comparator 22 in response to the clock signal of the clock circuit 60. The comparator 22 then outputs a pulse width modulation signal PWM to the PWM controller 70 by comparing the RAMP signal from the compensation circuit 242 with the compensation signal COMP from the RAMP generator 80.

Then, the PWM controller 70 outputs switch control signals to the first switch M1 and the second switch M2 of the switch circuit in response to the clock signal and the pulse width modulation signal PWM to instruct the drive circuit 20 to turn on or turn off the first switch M1 and the second switch M2 of the switch circuit.

In addition, the operational transconductance amplifier 10 provides the bias current IDS to the error amplifier 240 in accordance with the reference voltage VREF and the reference voltage VSS corresponding to the power-on operation mode. The error amplifier 240 outputs the error amplifier signal EAO based on the feedback voltage VFB, the reference voltage VSS and the bias current IDS in the power-on operation mode.

Further, when the self-adaptive startup compensation device enters the normal operation mode from the power-on operation mode, the reference voltage VSS is equal to or larger than the reference voltage VREF, the decreasing frequency operation is not performed. The error amplifier 240 outputs the error amplifier signal EAO based on the feedback voltage VFB and the reference voltage VREF in the normal operation mode.

Figure 7:
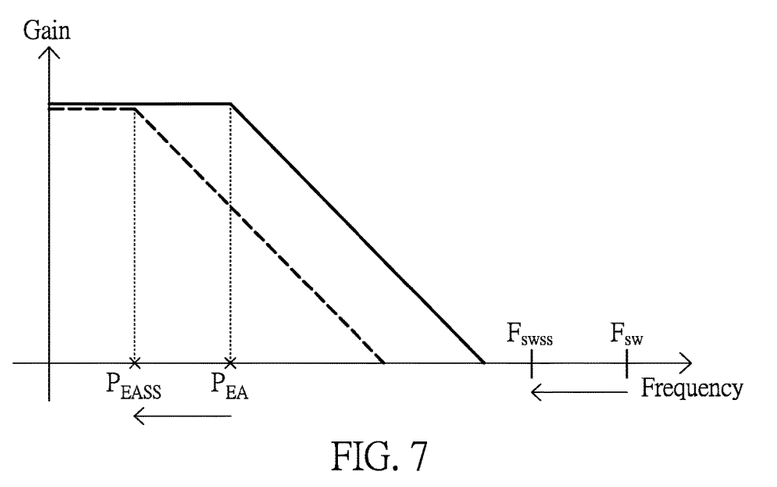
FIG. 7 is a curve diagram illustrating a gain versus frequency of the self-adaptive startup compensation device according to the second embodiment of the present disclosure.

Reference is next made to FIG. 7, a curve diagram illustrating a gain versus frequency of the self-adaptive startup compensation device according to the second embodiment of the present disclosure is shown.

As shown in FIG. 7, a horizontal axis represents frequency and a vertical axis represents gain, and curves represent gain versus frequency. The left curve having a relatively lower frequency represents that the self-adaptive startup compensation device is operated in the power-on operation mode (i.e. the decreasing frequency mode). The right curve having a relatively higher frequency represents that the self-adaptive startup compensation device is operated in the normal operation mode. The lower operating frequency needs a less bandwidth of a pole $P_{EASS}$ for stability concerns. It is made by the operational transconductance amplifier 10 according to VREF and VSS during power-on mode.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A self-adaptive startup compensation device, comprising:
    a reference voltage generating circuit, including:
        first to fifth transistors, an input terminal of the first transistor is connected to a voltage source, an output terminal of the first transistor is connected to input terminals of the second and third transistors, an output terminal of the second transistor is connected to a control terminal of the second transistor, an input terminal of the fourth transistor and a control terminal of the fifth transistor, an output terminal of the third transistor is connected to a control terminal of the third transistor and an input terminal of the fifth transistor, the output terminal of the third transistor is grounded through a first capacitor, and output terminals of the fourth and fifth transistors are grounded;
        first and second current mirrors, input terminals of the first current mirror are connected to the output terminal of the first transistor, first and second output terminals of the first current mirror are connected to input terminals of the second current mirror respectively, the second output terminal of the first current mirror is connected to control terminals of the first and fourth transistors; and
    a DC-to-DC converter, including:
        first and second transconductance amplifiers, a non-inverting input terminal of the first transconductance amplifier and an inverting input terminal of the second operational transconductance amplifier are connected to one terminal of the first capacitor that is connected to the third transistor, an inverting input terminal of the first transconductance amplifier and a non-inverting input terminal of the second operational transconductance amplifier are connected to the second output terminal of the first current mirror;
        an error amplifier having a bias input terminal connected to an output terminal of the first transconductance amplifier, a first non-inverting input terminal connected to the one terminal of the first capacitor in a decreasing frequency mode, and a second non-inverting input terminal connected to the second output terminal of the first current mirror in a constant frequency mode;
        a clock circuit having an input terminal connected to an output terminal of the second operational transconductance amplifier;
        a PWM controller and a RAMP generator, each of which has one input terminal connected to an output terminal of the clock circuit;
        a comparator having an inverting input terminal and a non-inverting input terminal which are connected to output terminals of the error amplifier and the RAMP generator respectively, and an output terminal connected to another input terminal of the PWM controller; and
        a switch circuit connected to an inverting input terminal of the error amplifier and an output terminal of the PWM controller.

2. The self-adaptive startup compensation device of claim 1, further comprising: a drive circuit disposed between the PWM controller and the switch circuit, the drive circuit has an input terminal connected to the output terminal of the PWM controller and an output terminal connected to a control terminal of the switch circuit.

3. The self-adaptive startup compensation device of claim 2, wherein the first non-inverting input terminal of the error amplifier is connected to the one terminal of the first capacitor, and the second non-inverting input terminal of the error amplifier is connected between the output terminal of the seventh transistor and the input terminal of the ninth transistor.

4. The self-adaptive startup compensation device of claim 2, wherein the second current mirror further includes a second capacitor, two terminals of the second capacitor are connected to the output terminal of the sixth transistor and the control terminal of the eight transistor respectively.

5. The self-adaptive startup compensation device of claim 1, further comprising: a divider circuit connected between the switch circuit and the error amplifier and configured to divide an output voltage from the switch circuit to output a feedback voltage to the inverting input terminal of the error amplifier.

6. The self-adaptive startup compensation device of claim 1, wherein the first current mirror includes sixth and seventh transistors and the second current mirror includes eighth to tenth transistors;

input terminals of the sixth and seventh transistors are connected to the output terminal of the first transistor, control terminals of the sixth and seventh transistors are connected to each other, an output terminal of the sixth transistor is connected to the control terminal of the sixth transistor and an input terminal of the eighth transistor;

control terminals of the eighth and tenth transistors are connected to each other, an input terminal of the tenth transistor is connected to the control terminal of the tenth transistor and the output terminal of the ninth transistor, an input terminal of the ninth transistor is connected to a control terminal of the ninth transistor and an output terminal of the seventh transistor, output terminals of the eight and tenth transistors are grounded.

7. The self-adaptive startup compensation device of claim 1, further comprising: a compensation circuit disposed between the error amplifier and the comparator, an input terminal of the compensation circuit is connected to the output terminal of the error amplifier, and an output terminal of the compensation circuit is connected to the inverting input terminal of the comparator.

8. The self-adaptive startup compensation device of claim 7, wherein the compensation circuit includes a resistor, a third capacitor and a fourth capacitor, two terminals of the resistor are connected to the output terminal of the error amplifier and one terminal of the third capacitor respectively, another terminal of the third capacitor is grounded, two terminals of the fourth capacitor are connected to the output terminal of the error amplifier and grounded respectively.

* * * * *